US011809231B2

(12) United States Patent
Feng (10) Patent No.: US 11,809,231 B2
(45) Date of Patent: Nov. 7, 2023

(54) DISPLAY DEVICE WITH FLEXIBLE DISPLAY PANEL CONNECTED TO TRANSMISSION MECHANISM

(71) Applicant: WUHAN CHINA STAR OPTOELECTRONICS SEMICONDUCTOR DISPLAY TECHNOLOGY CO., LTD., Wuhan (CN)

(72) Inventor: Zikang Feng, Wuhan (CN)

(73) Assignee: WUHAN CHINA STAR OPTOELECTRONICS SEMICONDUCTOR DISPLAY TECHNOLOGY CO., LTD., Wuhan (CN)

(*) Notice: Subject to any disclaimer, the term of this patent is extended or adjusted under 35 U.S.C. 154(b) by 644 days.

(21) Appl. No.: 16/960,897

(22) PCT Filed: Jun. 24, 2020

(86) PCT No.: PCT/CN2020/098099
§ 371 (c)(1),
(2) Date: Jul. 9, 2020

(87) PCT Pub. No.: WO2021/237852
PCT Pub. Date: Dec. 2, 2021

(65) Prior Publication Data
US 2023/0097200 A1 Mar. 30, 2023

(30) Foreign Application Priority Data
May 26, 2020 (CN) .......................... 202010455444.X (51) Int. Cl.
*G06F 1/16* (2006.01)

(52) U.S. Cl.
CPC .......... *G06F 1/1652* (2013.01); *G06F 1/1624* (2013.01); *G06F 1/1656* (2013.01)

(58) Field of Classification Search
CPC .. G06F 1/1652; G06F 1/1624; H04M 1/0268; H04M 1/0237; G09F 9/301
See application file for complete search history.

(56) References Cited

U.S. PATENT DOCUMENTS

| 8,711,566 B2* | 4/2014 | O'Brien | H04M 1/0268 361/724 |
| 11,016,532 B2* | 5/2021 | Yang | H04M 1/0268 |
| 11,058,018 B1* | 7/2021 | Yoon | H05K 5/0017 |

FOREIGN PATENT DOCUMENTS

| CN | 109712533 A | 5/2019 |
| CN | 110047384 A | 7/2019 |

(Continued)

OTHER PUBLICATIONS

International Search Report in International application No. PCT/CN2020/098099, dated Feb. 25, 2021.
(Continued)

*Primary Examiner* — James Wu
(74) *Attorney, Agent, or Firm* — PV IP PC; Wei Te Chung; Zhigang Ma (57) ABSTRACT

A display device is disclosed. The display device includes a housing assembly, a first support component, a second support component slidably disposed with the first support component, a transmission mechanism connected with the second support component, and a flexible display panel laid on a side of the first support component and the second support component, wherein a first end of the flexible display panel connects an end of the second support com-
(Continued)

ponent away from the first support component, and a second end of the flexible display panel connects the transmission mechanism.

12 Claims, 4 Drawing Sheets

(56) References Cited

FOREIGN PATENT DOCUMENTS

| | | |
|---|---|---|
| CN | 110111692 A | 8/2019 |
| CN | 110491289 A | 11/2019 |
| CN | 110782783 A | 2/2020 |
| KR | 20170116551 A | 10/2017 |

OTHER PUBLICATIONS

Written Opinion of the International Search Authority in International application No. PCT/CN2020/098099, dated Feb. 25, 2021.

\* cited by examiner

DISPLAY DEVICE WITH FLEXIBLE DISPLAY PANEL CONNECTED TO TRANSMISSION MECHANISM

FIELD DISCLOSURE

The present disclosure relates to the technical field of displays, and in particular to a display device.

BACKGROUND OF DISCLOSURE

With the development of the technologies, the appearance of mobile electric apparatuses changes dramatically. Flexible display panels attract attention due to their unique characteristics and huge potential. Compared with the traditional display panels, the flexible display panels can reduce the accident damage to the apparatuses and have higher durability than other display panels, due to the characteristics of flexibility and bendability.

The existing flexible display panels include foldable display panels and curlable display panels. Although the sizes of the two kinds of display panels are reduced, they still occupy large spaces.

Therefore, it is necessary to provide a display device to improve the technical problems stated above.

SUMMARY OF INVENTION

Technical Problems

The present disclosure provides a display device to solve the technical problem that the existing flexible display panels occupy large areas.

Technical Solutions

The present disclosure provides a display device. The display device includes a housing assembly, a first support component fixedly disposed with the housing assembly, a second support component slidably disposed with the first support component, and a transmission mechanism disposed in the housing assembly and connected with the second support component; and a flexible display panel laid on a side of the first support component and the second support component, wherein a first end of the flexible display panel connects an end of the second support component away from the first support component, and a second end of the flexible display panel connects the transmission mechanism.

When the first support component and the second support component slide relative to each other, the first end and the second end of the flexible display panel maintain a same moving distance in the same time under a function of the transmission mechanism In the display device of the present disclosure, the housing assembly includes a first housing and a second housing disposed opposite each other, wherein the first housing fixedly connects the first support component, and the second housing fixedly connects the second support component.

The flexible display panel includes a first portion positioned on a surface of the housing assembly, and a second portion positioned in the housing assembly.

The transmission mechanism includes a roller component positioned on the first housing, and a gear component positioned on the second housing, wherein the roller component engages the gear component.

When the display device displays in a small display panel mode, the first portion of the flexible display panel is in a display status, and the second portion of the flexible display panel is in a non-display status. When the display device displays in a large display panel mode, the gear component on the second housing drives the roller component to rotate, so that the second housing moves in a direction away from the first housing, and the second portion of the flexible display panel moves from an interior of the housing assembly to the surface of the housing assembly. The first portion and the second portion of the flexible display panel are in the display status.

In the display device of the present disclosure, the gear component at least includes a first rack and a second rack, the first rack is disposed adjacent to a first side of the second housing, and the second rack is disposed adjacent to a second side of the second housing.

When the display device displays in the large display panel mode, the first rack and the second rack drive the roller component to rotate along a first direction, so that the second housing moves in a direction away from the first housing.

In the display device of the present disclosure, the roller component at least includes:

a first rolling wheel positioned on a side of the first rack and the second rack away from the flexible display panel;

a first gear and a second gear positioned on the first rolling wheel, wherein the first gear and the second gear fixedly connect the first rolling wheel, the first gear engages the first rack, and the second gear engages the second rack;

a first bearing and a second bearing positioned on both sides of the first rolling wheel, wherein the first rolling wheel fixedly connects the first bearing and the second bearing, the first bearing is disposed adjacent to the first gear, the second bearing is disposed adjacent to the second gear, and the first bearing and the second bearing fixedly connect the first housing.

When the display device displays in the large display panel mode, the first rack and the second rack drive the first rolling wheel to rotate in the first bearing and the second bearing along a first direction by the first gear and the second gear.

In the display device of the present disclosure, the first rolling wheel fixedly connects a plurality of inner bearings of the first bearing and the second bearing, an outer bearing of the first bearing fixedly connects a first side casing of the first housing, and an outer bearing of the second bearing fixedly connects a second side casing of the first housing.

In the display device of the present disclosure, the first bearing and the second bearing may be a ball bearing and a sliding bearing.

In the display device of the present disclosure, the first gear and the second gear include a plurality of tooth slots positioned on two adjacent gear teeth, and a part of the tooth slots is concave in the first rolling wheel.

In the display device of the present disclosure, an indexing circle diameter of the first gear and an indexing circle diameter of the second gear are equal to a diameter of the first rolling wheel.

In the display device of the present disclosure, the roller component further includes a second rolling wheel positioned in the first housing, and a third bearing and a fourth bearing positioned on both sides of the second rolling wheel, wherein the third bearing and the fourth bearing are fixed on the first housing, and the first rolling wheel fixedly connects the third bearing and the fourth bearing.

When the display device displays in the large display panel mode, an external driving force causes the second housing to move in a direction away from the first housing, and the flexible display panel rolls along the second rolling wheel in a first direction, so that the second portion of the flexible display panel moves from an interior of the first housing to a surface of the first housing.

When the display device displays in the small display panel mode, the external driving force causes the second housing to move in a direction adjacent to the first housing, and the flexible display panel rolls along the second rolling wheel in a second direction, so that the second portion of the flexible display panel moves from the surface of the first housing to the interior of the first housing and extends to the first rolling wheel.

In the display device of the present disclosure, the flexible display panel includes a display panel, a stretching layer, and a bonding layer positioned between the display panel and the stretching layer.

A first end of the stretching layer fixedly connects the second housing, and a second end of the stretching layer fixedly connects the first rolling wheel.

In the display device of the present disclosure, an area of the display panel is less than an area of the stretching layer.

In the display device of the present disclosure, the flexible display panel further includes a third portion curled on the first rolling wheel, wherein the third portion of the flexible display panel corresponds to the stretching layer, and the third portion of the flexible display panel is a non-function region of the display device.

In the display device of the present disclosure, a material of the stretching layer may be tensile-resistant steel special use stainless (SUS) metal materials or amorphous materials.

In the display device of the present disclosure, the bonding layer is an adhesive layer with adhesive properties such as an optical adhesive.

In the display device of the present disclosure, the second housing further includes a first packaging cover, a second packaging cover, and an accommodating cavity formed and surrounded by the second support component, the first packaging cover, and the second packaging cover. The accommodating cavity is used to accommodate the first support component.

When the display device displays in the small display panel mode, the second support component is disposed adjacent to the first portion of the flexible display panel, the first support component is disposed away from the first portion of the flexible display panel, and the first support component is positioned in the accommodating cavity. The second support component is used to support the first potion of the flexible display panel;

When the display device displays in the large display panel mode, the second support component moves in a direction away from the first housing, the second portion of the flexible display panel moves from an interior of the first housing to a surface of the first housing, and the first support component moves from an interior of the accommodating cavity to the second portion adjacent to the flexible display panel. The second support component is used to support the first portion of the flexible display panel, and the first support component is used to support the second portion of the flexible display panel In the display device of the present disclosure, the display device further includes a compensate component positioned in the first housing, and away from the first support component and the second support component.

When the display device displays in the large display panel mode, the compensate component moves to an area between the first housing and the second housing, and increases a supporting force between the first portion and the second portion of the display assembly.

In the display device of the present disclosure, the compensate component is a support prism disposed along the first rolling wheel.

In the display device of the present disclosure, the first support component and the second support component may be mutually matched triangular prisms.

In the display device of the present disclosure, a processor, a driving chip, and an electric assembly are disposed in the housing assembly.

Beneficial Effects

In the present disclosure, the first support component and the second support component slide relative to each other by facilitating disposing the transmission mechanism on the display device. Moreover, when the display device is stretched or collapsed, the display device dose not receive an excessive pulling force by maintaining the same moving distance in the same time, so that the damage to the flexible display panel is prevented, and a service lifespan of the display device is extended. Additionally, the large display panel mode and the small display panel mode of the flexible display panel may be achieved under the premise of not further expanding the volume.

DETAILED DESCRIPTION OF EMBODIMENTS

In order to clearly illustrate the purpose and the technical solutions in the present disclosure, the drawings used in the description of the embodiments will be explained in detail below. It is noted that the embodiments stated here are only used to explain the present disclosure, not to limit the present disclosure.

Compared with the traditional display panels, the present flexible display panels can reduce the accident damage to the apparatus, and have higher durability than other display panels, due to the characteristics of flexibility and bendability. Although the sizes of the display panels are reduced, they still occupy large spaces. Based on the technical problems stated above, the present disclosure provides technical solutions as below:

Please refer to FIGS. 1-7. The present disclosure provides a display device 100.

The display device 100 includes: a housing assembly 10, a first support component 401 fixedly disposed with the housing assembly 10, a second support component 402 slidably disposed with the first support component 401, and a transmission mechanism disposed in the housing assembly 10 and connected with the second support component 402; and a flexible display panel 20 laid on a side of the first support component 401 and the second support component 402, wherein a first end of the flexible display panel 20 connects an end of the second support component 402 away from the first support component 401, and a second end of the flexible display panel 20 connects the transmission mechanism.

When the first support component 401 and the second support component 402 slide relative to each other, the first end and the second end of the flexible display panel 20 maintain a same moving distance in the same time under a function of the transmission mechanism.

In the present disclosure, the first support component 401 and the second support component 402 slide relative to each other by facilitating disposing the transmission mechanism on the display device 100. Moreover, under the premise of not further expanding the volume, the large display panel mode and the small display panel mode of the flexible display panel may be achieved by maintaining the same moving distance in the same time.

The technical solutions in the present disclosure are described in combination with the specific embodiments.

Please refer to FIGS. 1-7. The housing assembly 10 may include a first housing 11 and a second housing 12 disposed opposite each other. The first housing 11 fixedly connects the first support component 401, and the second housing 12 fixedly connects the second support component 401. The flexible display panel 20 may include a first portion 21 positioned on a surface of the housing assembly 10, and a second portion 22 positioned in the housing assembly 10. The transmission mechanism may include a roller component positioned on the first housing 11 and a gear component positioned on the second housing 12, wherein the roller component engages the gear component.

When the display device 100 displays in a small display panel mode, the first portion 21 of the flexible display panel 20 is in a display status, and the second portion 22 of the flexible display panel 20 is in a non-display status. When the display device 100 displays in a large display panel mode, the gear component on the second housing 12 drives the roller component to rotate, so that the second housing 12 moves in a direction away from the first housing 11, and the second portion 22 of the flexible display panel 20 moves from an interior of the housing assembly 10 to the surface of the housing assembly 10, wherein the first portion 21 and the second portion 22 of the flexible display panel 20 are in the display status.

Figure 1:
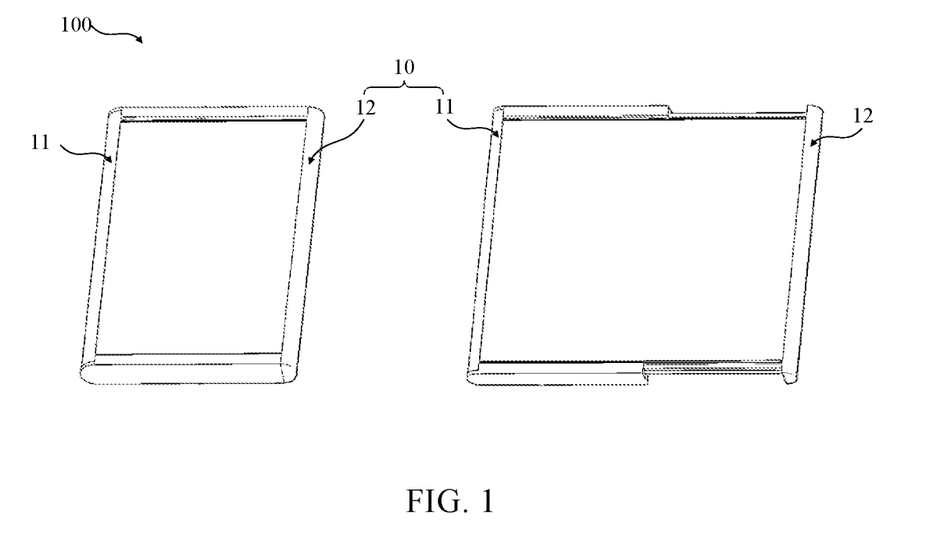
FIG. 1 is a simplified view of a display device of the present disclosure.

Please refer to FIG. 1. A left drawing is a structure view of the display device 100 in a contracted status, and a right drawing is a structure view of the display device 100 in an extended status. A user moves the second housing 12 in a direction away from the first housing 11 by applying a driving force along a third direction, so that the display device 100 is in the extended status. Accordingly, the user can move the second housing 12 in a direction adjacent to the first housing 11 by applying a driving force along a direction opposite the third direction, so that the display device 100 is in the contracted status.

In the present embodiment, the third direction is an extending direction of the second housing 12.

Figure 2:
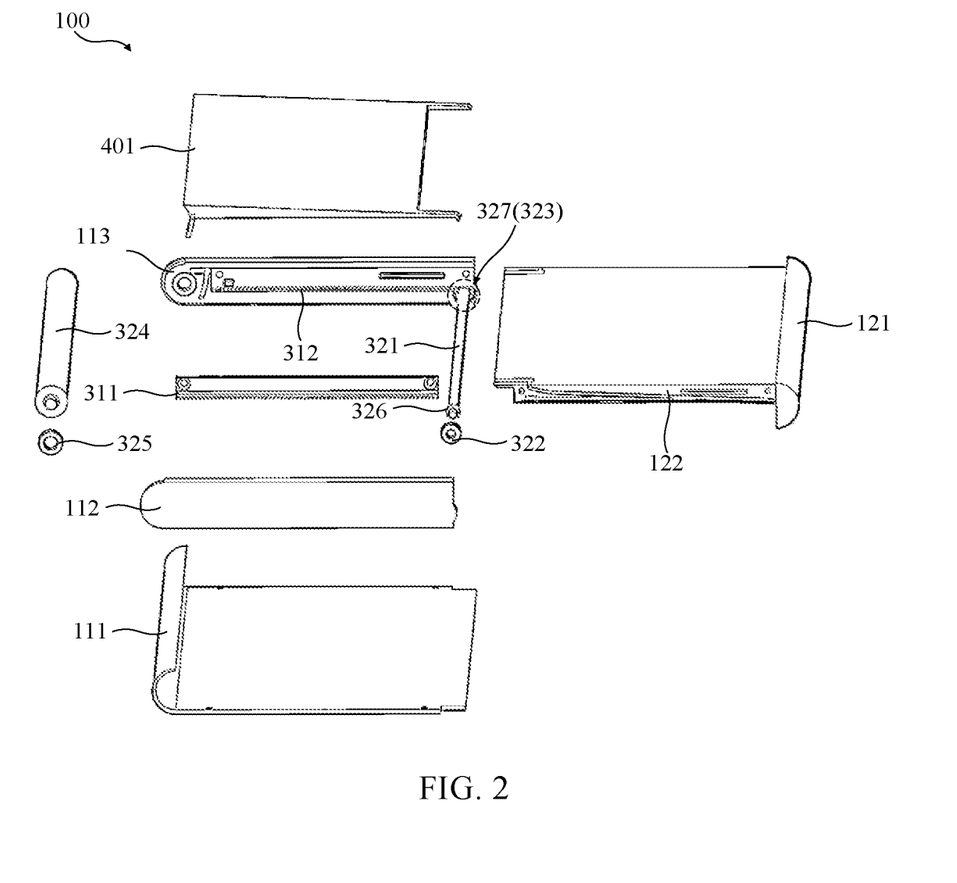
FIG. 2 is an exploded view of the display device of the present disclosure.

Please refer to FIG. 2. The first housing 11 includes a back housing 111, a first side casing 112, and a second side casing 113, wherein the first side casing 112 and the second side casing 113 are positioned on both sides of the back housing 111. The first side casing 112 corresponds to a first side of the first housing 11, and the second side casing 113 corresponds to a second side of the first housing 11. The second housing 12 includes a front housing 121, a first packaging cover 122, and a second packaging cover, wherein the first packaging cover 122 and the second packaging cover are positioned on both sides of the front housing 121. The first packaging cover 122 corresponds to a first side of the second housing 12, and the second packaging cover corresponds to a second side of the second housing 12. The first packaging cover 122 and the second packaging cover are positioned between the first side casing 112 and the second side casing 113.

When the display device 100 displays in the large display panel mode, an external driving force drives the front housing 121 to move in the third direction, so that the display device 100 is in the extended status.

In the present embodiment, the gear component at least includes a first rack 311 and a second rack 312, the first rack 311 is disposed adjacent to a first side of the second housing 12, and the second rack 312 is disposed adjacent to a second side of the second housing 12.

In the present embodiment, the first rack 311 may be embedded in the first packaging cover 122, and the second rack 312 may be embedded in the second packaging cover. The first rack 311 and the second rack 312 may position on an outer side or an inner side of the packaging cover which is not limited in the present disclosure.

Figure 3:
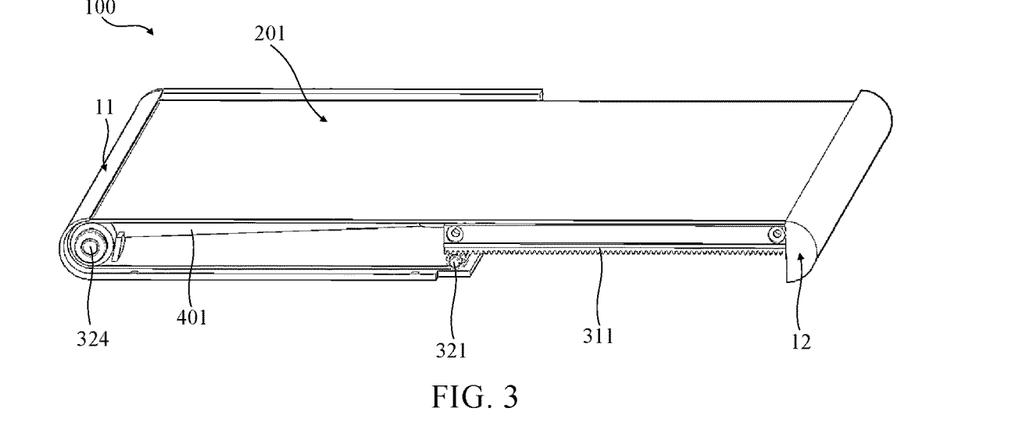
FIG. 3 is a simplified view of a structure of the display device of the present disclosure in an extending status.
Figure 4:
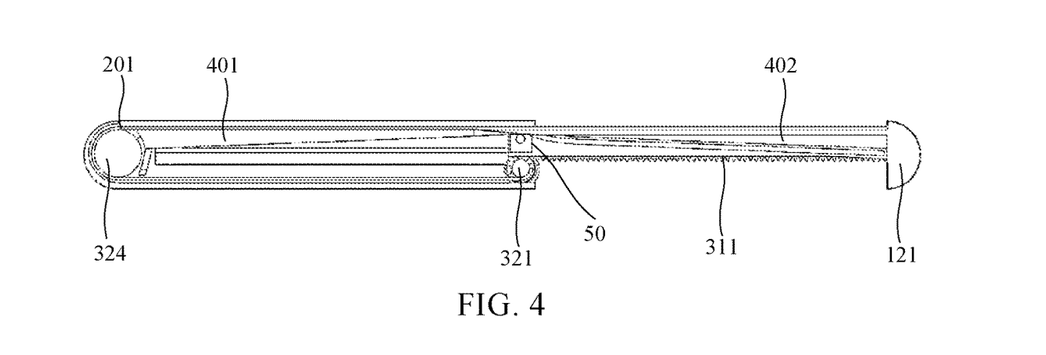
FIG. 4 is a section view of the display device of the present disclosure in the extending status.

Please refer to FIGS. 3-4. When the display device 100 displays in the large display panel mode, the first rack 311 and the second rack 312 drive the roller component to rotate along a first direction, so that the second housing 12 moves in a direction away from the first housing 11. The first rack 311 and the second rack 312 follow the second housing 12 and move in the direction away from the first housing 11.

In the present embodiment, the first direction is a clockwise direction in a main view of the display device.

In the present embodiment, the quantity of the racks is not limited to two and may be more. For example, a plurality of racks may be disposed between the first side and the second side of the second housing 12, wherein each distance between the adjacent racks is the same.

Please refer to FIG. 2. The roller component at least includes: a first rolling wheel 321 positioned on a side of the first rack 311, and the second rack 312 away from the flexible display panel 20;

a first gear 326 and a second gear 327 positioned on the first rolling wheel 321, wherein the first gear 326 and the second gear 327 fixedly connect the first rolling wheel 321, the first gear 326 engages the first rack 311, and the second gear 327 engages the second rack 312;

a first bearing 322 and a second bearing 323 positioned on both sides of the first rolling wheel 321, wherein the first rolling wheel 321 fixedly connects the first bearing 322 and the second bearing 323, the first bearing 322 is disposed adjacent to the first gear 326, the second bearing 323 is disposed adjacent to the second gear 327, and the first bearing 322 and the second bearing 323 fixedly connect the first housing 11.

Please refer to FIGS. 3-4. When the display device 100 displays in the large display panel mode, the first rack 311 and the second rack 312 drive the first rolling wheel 321 to rotate in the first bearing 322 and the second bearing 323 along a first direction by the first gear 326 and the second gear 327.

In the present embodiment, the first rolling wheel 321 may be positioned on an edge side of the first housing 11. Moreover, the first bearing 322 fixedly connects a first side casing 112 of the first housing 11, and a second bearing 323 fixedly connects a second side casing 113 of the first housing 11, so that the first rolling wheel 321 may rotate in the first bearing 322 and the second bearing 323.

In the present embodiment, the first bearing 322 and the second bearing 323 may be a ball bearing, a sliding bearing, etc. which are not limited in the present disclosure. The first rolling wheel 321 connects the first bearing 322 and the second bearing 323, the first bearing 322 connects a first side casing 112 of the first housing 11, and of the second bearing 323 connects a second side casing 113 of the first housing 11. The first rolling wheel 321 rotate in the first bearing 322 and the second bearing 323 under a function of an external driving force.

In the present embodiment, the quantity of the gears is not limited to two stated above. Each of the gears corresponds to each of the racks.

In the present embodiment, the first gear 326 and the second gear 327 include a plurality of tooth slots positioned on two adjacent gear teeth, and a part of the tooth slots is concave in the first rolling wheel 321.

When the rack matches the corresponding gear, the gear teeth of the rack are matched with the tooth slots of the gear. In a direction of a horizontal axis of the first rolling wheel 321, the rack and the gear may be loose, so that the friction force of the gear and the rack is increased, and the abrasion of the gear and the rack is increased. In the present disclosure, a plurality of the tooth slots positioned on the first gear 326 and the second gear 327 are concave in the first rolling wheel, so that when the gear teeth on the rack are matched with the tooth slots of the gear, since the lateral blocking of the first rolling wheel 321, a lateral loosening does not occur. Therefore, the stability of the matching of the rack and the gear is ensured.

In the present embodiment, an indexing circle diameter of the first gear 326 and an indexing circle diameter of the second gear 327 are equal to a diameter of the first rolling wheel 321. In order to accurately control a stretching distance of the second housing 12 and a moving distance of the flexible display panel 20 from an interior of the first housing 11 to an exterior of the first housing 11, which means when the second housing 12 moves a X distance in the third direction, the first rack 311 and the second rack 312 also move the X distance in the third distance, and the indexing circle diameters of the first gear 326 and the second gear 327 are equal to the diameter of the first rolling wheel 321. Therefore, the arc of rotation of the first gear 326, the second gear 327, and the first rolling wheel 321 is also X. That is, the arc distance of the rotation of the first rolling wheel 321 is equal to the stretching distance of the second housing 12. Consequently, when the first support component 401 and the second support component 402 slide relative to each other, the first end and the second end of the flexible display panel 20 maintain the same moving distance in the same time under a function of the transmission mechanism.

In the present embodiment, a first end of the flexible display panel 20 fixedly connects the second housing 12, and a second end of the flexible display panel 20 fixedly connects the first rolling wheel 321. That is, in combination with the technical solutions described above, a moving distance of the second housing 12 in the third direction is equal to a releasing distance of the first rolling wheel 321.

In the display device 100 of the present disclosure, the roller component further includes a second rolling wheel 324 positioned in the first housing 11, and a third bearing 325 and a fourth bearing (not showing in the figures) positioned on both sides of the second rolling wheel 324, wherein the third bearing 325 and the fourth bearing are fixed on the first housing 11, and the first rolling wheel 321 fixedly connects the third bearing 325 and the fourth bearing.

Please refer to FIG. 2. The third bearing 325 corresponds to the first bearing 322, the fourth bearing corresponds to the second bearing 323, and the second rolling wheel 324 rotates in the third bearing 325 and the fourth bearing.

In the present embodiment, the third bearing 325 and the fourth bearing may be the same as the first bearing 322 and the second bearing 323 which is not limited in the present disclosure.

In the present embodiment, the flexible display panel 20 extends from an outer side of the first housing 11 to an inner side of the first housing 11 by the second rolling wheel 324. The flexible display panel 20 reverses in 180° by the second rolling wheel 324 and extends to the first rolling wheel 321, so that the end of the flexible display panel 20 fixedly connects the first rolling wheel 321.

Please refer to FIGS. 3-4. When the display device 100 displays in the large display panel mode, an external driving force causes the second housing 12 to move in a direction away from the first housing 11. The first rack 311 and the second rack 312 drive the first rolling wheel 321 to rotate along a first direction by the corresponding first gear 326 and the second gear 327. The first rolling wheel 321 releases the flexible display panel 20 fixed thereon, and drives the second rolling wheel 324 to rotate along the first direction, so that the second portion 22 of the flexible display panel 20 moves from an interior of the first housing 11 to a surface of the first housing 11.

Figure 5:
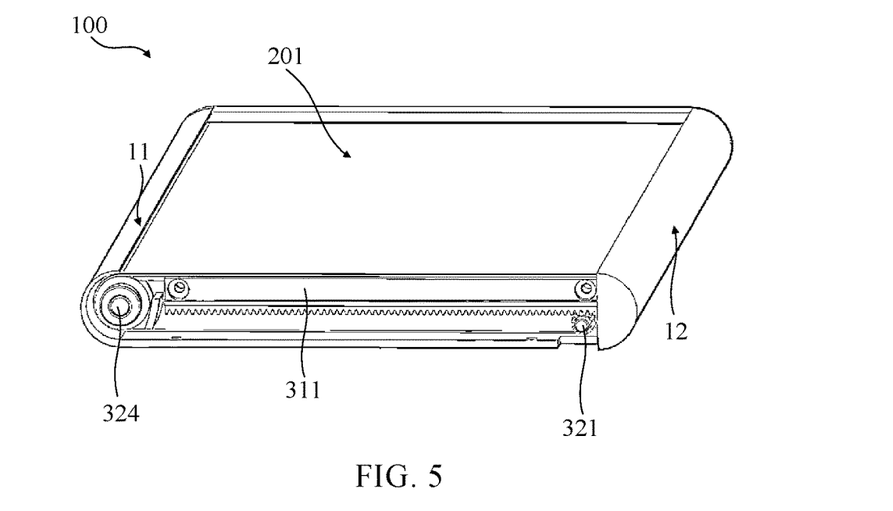
FIG. 5 is a simplified view of a structure of the display device of the present disclosure in a contracted status.
Figure 6:
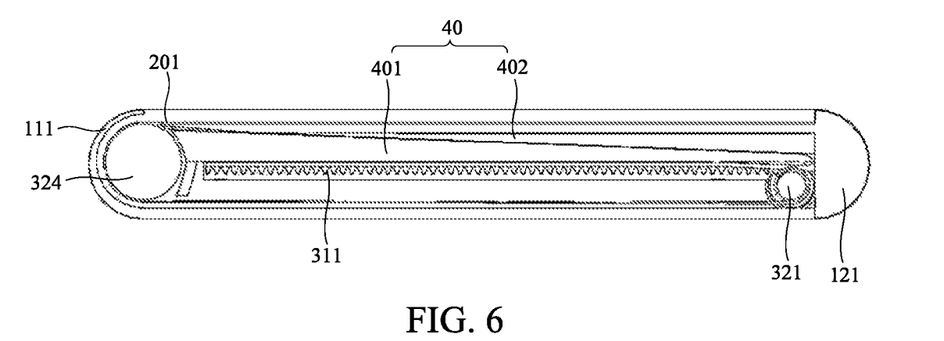
FIG. 6 is a section view of the display device of the present disclosure in the contracted status.

Please refer to FIGS. 5-6. When the display device 100 displays in the small display panel mode, the external driving force causes the second housing 12 to move in a direction adjacent to the first housing 11. The first rack 311 and the second rack 312 drive the first rolling wheel 321 to rotate along a second direction by the corresponding first gear 326 and the second gear 327. The first rolling wheel 321 tightens the flexible display panel 20 fixed thereon, and drives the second rolling wheel 324 to rotate along the second direction, so that the second portion 22 of the flexible display panel 20 moves from the surface of the first housing 11 to the interior of the first housing 11 and extends to the first rolling wheel 321.

In the present embodiment, the second direction is a counterclockwise direction in a main view of the display device.

Figure 7:
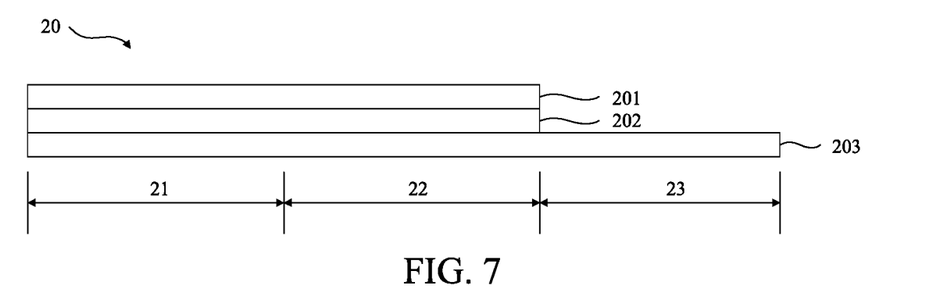
FIG. 7 is an expanded view of a flexible display panel in the display device of the present disclosure.

Please refer to FIG. 7. The flexible display panel 20 may include a display panel 201, a stretching layer 203, and a bonding layer 202 positioned between the display panel 201 and the stretching layer 203. A first end of the stretching layer 203 fixedly connects the second housing 12, and a second end of the stretching layer 203 fixedly connects the first rolling wheel 321.

In the present embodiment, the flexible display panel 20 further includes a third portion 23 curled around the first rolling wheel 321. The third portion of the flexible display panel corresponds to the stretching layer, and the third portion of the flexible display panel is a non-function region of the display device. That is, in FIG. 7, the third portion of the flexible display panel 20 only corresponds to the stretching layer 203, and the stretching layer 203 is curled around the first rolling wheel.

In the present embodiment, the display panel 201 may be a liquid crystal display (LCD) panel or an organic light-emitting diode (OLED) display panel. The display panel 201 may be curled in any shape.

In the present embodiment, an area of the display panel 201 is less than an area of the stretching layer 203.

In the present embodiment, the bonding layer 202 is an adhesive layer with adhesive properties, such as an optical adhesive In the present embodiment, a material of the stretching layer may be tensile-resistant steel special use stainless (SUS) metal materials or amorphous materials. When a material of the stretching layer 203 is SUS metal material, a thickness of the stretching layer 203 may be 25-35 microns.

In the present embodiment, the flexible display panel 20 curled around the first rolling wheel 321 is the stretching layer 203 of the flexible display panel 20, i.e. a non-displaying region. The second portion 22 of the flexible display panel 20 is positioned on a portion between the first rolling wheel 321 and the second rolling wheel 324, and on a portion surrounding the second rolling wheel 324.

In the present embodiment, the flexible display panel 20 is not limited to fixedly connect the first rolling wheel 321. For example, a slider is added in the present embodiment, wherein one end of the slider fixedly is connected to the first rolling wheel 321, and the other end of the slider fixedly is connected to the flexible display panel 20. Alternatively, a third rolling wheel is disposed between the first rolling wheel 321 and the second rolling wheel 324, so that the flexible display panel 20 fixedly connects the third rolling wheel, and the direction is set by the second rolling wheel 324 and the first rolling wheel 321. That is, a stretching length of the second housing 12 may be increased, and a displaying size of the display device 100 may be further increased.

In the display device 100 of the present disclosure, the display device 100 further includes a support assembly 40 positioned in the housing assembly 10, wherein the support assembly 40 is used to support the flexible display panel 20. The support assembly 40 includes a first support component 401 fixedly connected with the first housing 11, and a second support component 402 fixedly connected with the second housing 12.

In the present embodiment, the second housing 12 further includes an accommodating cavity formed and surrounded by the second support component 402, the first packaging cover 122, and the second packaging cover, wherein the accommodating cavity is used to accommodate the first support component 401.

Please refer to FIGS. 5-6. When the display device 100 displays in the small display panel mode, the second support component 402 is disposed adjacent to the first portion 21 of the flexible display panel 20, and the first support component 401 is positioned in the accommodating cavity and disposed away from the first portion 21 of the flexible display panel 20. The second support component 402 is used to support the first portion 21 of the flexible display panel 20.

Please refer to FIGS. 3-4. When the display device 100 displays in the large display panel mode, the second support component 402 moves in a direction away from the first housing 11. The second portion 22 of the flexible display panel 20 moves from an interior of the first housing 11 to a surface of the first housing 11, and the first support component 401 moves from an interior of the accommodating cavity to the second portion 22 adjacent to the flexible display panel 20. The second support component 402 is used to support the first portion 21 of the flexible display panel 20, and the first support component 401 is used to support the second portion 22 of the flexible display panel 20.

In the present embodiment, the first support component 401 and the second support component 402 may be mutually matched triangular prisms. When the display device displays in the small display panel mode, the first support component 401 and the second support component 402 are gathered and formed a regular rectangle. Due to the existence of the second rolling wheel 324, a region of the second support component 401 adjacent to the second rolling wheel 324 needs to be matched with the second rolling wheel 324, and support the flexible display panel 20 positioned on the second rolling wheel 324. The second rolling wheel 324 may be a non-regular shape. When the display device 100 displays in the large display panel mode. The first support component 401 is separated from the second support component 402. The first support component 401 and the second support component 402 correspond to the flexible display panel respectively.

In the present embodiment, the first support component 401 and the second support component 402 may be mutually matched comb-like support rods which is not limited in the present disclosure.

In the display device 100 of the present disclosure, the display device 100 may further include a compensate component (not showing in the figures) positioned in the first housing 11 and away from the support component 40. When the display device 100 displays in the large display panel mode, the compensate component moves to an area between the first housing 11 and the second housing 12, so as to increase a supporting force between the first portion 21 and the second portion 22 of the flexible display assembly 20.

In the FIG. 6, a thickness of the support component 40 corresponding to the area between the first housing 11 and the second housing 12 is less, and a center of the flexible display panel 20 is positioned between the first housing 11 and the second housing 12. Therefore, the area may cause the flexible display panel 20 to move downward and form a concave surface due to an excessive gravity. The supporting force between the first portion 21 and the second portion 22 is increased by the arrangement of the compensate mechanism in the present disclosure.

In the present embodiment, the compensate mechanism may be support prisms disposed along the first rolling wheel 321.

Figure 8:
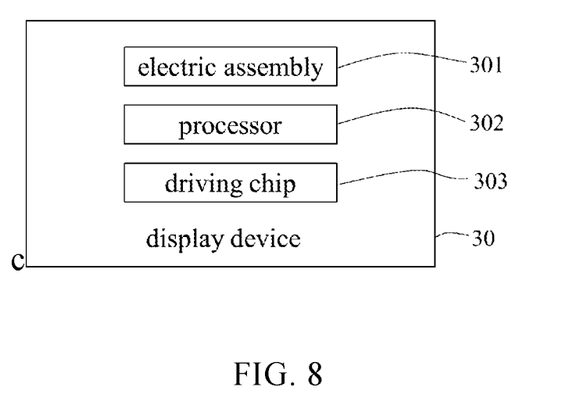
FIG. 8 is a block view of a housing assembly in the display device of the present disclosure.

In the display device 100 of the present disclosure, a processor, a driving chip, an electric assembly, etc., are disposed in the housing assembly 10.

The present disclosure provides a display device. The display device includes a housing assembly, a first support component fixedly disposed with the housing assembly, a second support component slidably disposed with the first support component, and a transmission mechanism disposed in the housing assembly and connected with the second support component. The display device includes a flexible display panel laid on a side of the first support component and the second support component, wherein a first end of the flexible display panel connects an end of the second support component away from the first support component, and a second end of the flexible display panel connects the transmission mechanism. In the present disclosure, the first support component and the second support component slide relative to each other by facilitating disposing the transmission mechanism on the display device. Moreover, when the display device is stretched or collapsed, the display device dose not receive an excessive pulling force by maintaining the same moving distance in the same time, so that the damage to the flexible display panel is prevented, and a service life-span of the display device is extended. Additionally, the large display panel mode and the small display panel mode of the flexible display panel may be achieved under the premise of not further expanding the volume.

It should be understood by those skilled in the art that they can still equivalently replace or modify some of the technical features based on the technical solutions and technical conceptions of the present disclosure, and these modifications and replacements shall belong to the scope of protection of the claims of the present disclosure.

What is claimed is:

1. A display device, comprising:
a housing assembly, a first support component fixedly disposed with the housing assembly, a second support component slidably disposed with the first support component, and a transmission mechanism disposed in the housing assembly and connected with the second support component; and
a flexible display panel laid on a side of the first support component and the second support component, wherein a first end of the flexible display panel connects an end of the second support component away from the first support component, and a second end of the flexible display panel connects the transmission mechanism;
wherein when the first support component and the second support component slide relative to each other, the first end and the second end of the flexible display panel maintain a same moving distance in the same time under a function of the transmission mechanism;
wherein the housing assembly comprises a first housing and a second housing disposed opposite each other, the first housing fixedly connected with the first support component, and the second housing fixedly disposed with the second support component; the flexible display panel comprises a first portion positioned on a surface of the housing assembly and a second portion positioned in the housing assembly; the transmission mechanism comprises a roller component positioned on the first housing and a gear component positioned on the second housing, wherein the roller component engages the gear component; when the display device displays in a small display panel mode, the first portion of the flexible display panel is in a display status and the second portion of the flexible display panel is in a non-display status; when the display device displays in a large display panel mode, the gear component on the second housing drives the roller component to rotate, so that the second housing moves in a direction away from the first housing and the second portion of the flexible display panel moves from an interior of the housing assembly to the surface of the housing assembly, wherein the first portion and the second portion of the flexible display panel are in the display status;
wherein the gear component at least comprises a first rack and a second rack, the first rack is disposed adjacent to a first side of the second housing, the second rack is disposed adjacent to a second side of the second housing, and when the display device displays in the large display panel mode, the first rack and the second rack drive the roller component to rotate along a first direction, so that the second housing moves in a direction away from the first housing;
wherein the roller component at least comprises:
a first rolling wheel positioned on a side of the first rack and a side of the second rack;
a first gear and a second gear positioned on the first rolling wheel, wherein the first gear and the second gear fixedly connect the first rolling wheel, the first gear engages the first rack, and the second gear engages the second rack;
a first bearing and a second bearing positioned on both sides of the first rolling wheel, wherein the first rolling wheel fixedly connects the first bearing and the second bearing, the first bearing is disposed adjacent to the first gear, the second bearing is disposed adjacent to the second gear, and the first bearing and the second bearing fixedly connect the first housing;
wherein when the display device displays in the large display panel mode, the first rack and the second rack drive the first rolling wheel to rotate in the first bearing and the second bearing along the first direction by the first gear and the second gear.

2. The display device as claimed in claim 1, wherein the first rolling wheel connects the first bearing and the second bearing, the first bearing connects a first side casing of the first housing, and the second bearing connects a second side casing of the first housing.

3. The display device as claimed in claim 1, wherein the roller component further comprises a second rolling wheel positioned in the first housing, and a third bearing and a fourth bearing positioned on both sides of the second rolling wheel, wherein the third bearing and the fourth bearing are fixed on the first housing, and the first rolling wheel fixedly connects the third bearing and the fourth bearing;
when the display device displays in the large display panel mode, an external driving force causes the second housing to move in a direction away from the first housing, and the flexible display panel rolls along the second rolling wheel in the first direction, so that the second portion of the flexible display panel moves from an interior of the first housing to a surface of the first housing;
when the display device displays in the small display panel mode, the external driving force causes the second housing to move in a direction adjacent to the first housing, and the flexible display panel rolls along the second rolling wheel in a second direction, so that the second portion of the flexible display panel moves from the surface of the first housing to the interior of the first housing and extends to the first rolling wheel.

4. The display device as claimed in claim 3, wherein the flexible display panel comprises a display panel, a stretching layer, and a bonding layer positioned between the display panel and the stretching layer; wherein a first end of the stretching layer fixedly connects the second housing, and a second end of the stretching layer fixedly connects the first rolling wheel.

5. The display device as claimed in claim 4, wherein an area of the display panel is less than an area of the stretching layer.

6. The display device as claimed in claim 5, wherein the flexible display panel further comprises a third portion curled on the first rolling wheel, wherein the third portion of the flexible display panel corresponds to the stretching layer, and the third portion of the flexible display panel is a non-function region of the display device.

7. The display device as claimed in claim 4, wherein a material of the stretching layer may be tensile-resistant steel special use stainless (SUS) metal materials or amorphous materials.

8. The display device as claimed in claim 4, wherein the bonding layer is an adhesive layer with adhesive properties such as an optical adhesive.

9. The display device as claimed in claim 1, wherein the second housing further comprises a first packaging cover, a second packaging cover, and an accommodating cavity formed and surrounded by the second support component, the first packaging cover, and the second packaging cover, wherein the accommodating cavity is used to accommodate the first support component;

when the display device displays in the small display panel mode, the second support component is disposed adjacent to the first portion of the flexible display panel, the first support component is disposed away from the first portion of the flexible display panel, the first support component is positioned in the accommodating cavity, and the second support component is used to support the first potion of the flexible display panel;

when the display device displays in the large display panel mode, the second support component moves in a direction away from the first housing, the second portion of the flexible display panel moves from an interior of the first housing to a surface of the first housing, the first support component moves from an interior of the accommodating cavity to the second portion adjacent to the flexible display panel, the second support component is used to support the first portion of the flexible display panel, and the first support component is used to support the second portion of the flexible display panel.

10. The display device as claimed in claim 9, wherein the display device further comprises a support prism positioned in the first housing and away from the first support component and the second support component;

when the display device displays in the large display panel mode, the support prism moves to an area between the first housing and the second housing.

11. The display device as claimed in claim 9, wherein the first support component and the second support component may be mutually matched triangular prisms.

12. The display device as claimed in claim 1, wherein a processor, a driving chip, and an electric assembly are disposed in the housing assembly.

* * * * *